US007419258B2

(12) United States Patent
Murakami et al.

(10) Patent No.: US 7,419,258 B2
(45) Date of Patent: Sep. 2, 2008

(54) ELECTRONIC DEVICE HAVING DETACHABLE CONTROLLER

(75) Inventors: Atsushi Murakami, Aichi-ken (JP); Masaaki Hori, Tajimi (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 8 days.

(21) Appl. No.: 10/671,832

(22) Filed: Sep. 29, 2003

(65) Prior Publication Data

US 2004/0125155 A1     Jul. 1, 2004

(30) Foreign Application Priority Data

Sep. 30, 2002   (JP) ................ 2002-286220

(51) Int. Cl.
*B41J 29/13* (2006.01)
(52) U.S. Cl. ............................................. 347/108
(58) Field of Classification Search ............ 347/2, 347/19, 86, 109, 108
See application file for complete search history.

(56) References Cited

U.S. PATENT DOCUMENTS 4,498,088 A * 2/1985 Kanayama .............. 347/92
6,322,194 B1 * 11/2001 Silverbrook ............ 347/19
6,375,299 B1 * 4/2002 Foster et al. ............ 347/19
6,866,359 B2 * 3/2005 Pan et al. ................ 347/19

FOREIGN PATENT DOCUMENTS

| JP | A 54-123079 | 9/1979 |
| JP | A 2-60496 | 2/1990 |
| JP | B2 2744094 | 2/1998 |
| JP | B2 2986718 | 10/1999 |
| JP | A 2001-80108 | 3/2001 |
| JP | B2 3183759 | 4/2001 |
| JP | B2 3220939 | 8/2001 |
| JP | A 2001-347706 | 12/2001 |
| JP | A 2002-116822 | 4/2002 |

* cited by examiner

*Primary Examiner*—Julian D Huffman
(74) *Attorney, Agent, or Firm*—Oliff & Berridge, PLC

(57) ABSTRACT

A printer includes a first housing and a second housing. The first housing has a driver circuit board mounting an EEPROM storing control information regarding a mechanical module. The second housing is provided with a control circuit board storing a program for controlling the printer. In the printer, when the housings are assembled, the control information is available on the program, the control circuit board controls the mechanical module based on the program. Thus, in this printer, even when a component of the mechanical module has been replaced with a new one, the control circuit board can control the mechanical module smoothly based on the control information after replacement because the control information of the mechanical module is stored on in the EEPROM.

13 Claims, 10 Drawing Sheets

ELECTRONIC DEVICE HAVING DETACHABLE CONTROLLER

BACKGROUND OF THE INVENTION

1. Field of Invention

The invention relates to an electronic device having a detachable controller that controls a controlled part provided in a frame of the electronic device.

2. Description of Related Art

Conventionally, information machines provided with printing devices, such as serial printers, include a motor, a guide shaft, a carriage that is movable along the guide shaft, a recording head mounted on the carriage, and some mechanical driving mechanisms, such as a paper supply mechanism and a paper ejection mechanism. Such information machines include a control circuit board, which functions as a controller, to control the mechanical mechanisms, and this control is performed by applying a driving force given by a drive source, such as the motor to the mechanical driving mechanisms optimally.

However, upon control of the information machines, each element of a mechanical driving mechanism may have uncertain factors, such as size and shape errors, attaching position errors, and individual differences in motor skills. Accurate control cannot be performed unless these uncertain factors are considered.

For example, in a printer disclosed in Japanese Laid-Open Patent Publication No. 2001-347706, control information for correcting each uncertain factor of the printer is added to a standard program (firmware) and installed in a non-volatile memory (i.e., EEPROM) on a control circuit board to control mechanical driving mechanisms by the program modified based on the control information.

There are various kinds of control circuit boards for use in information machines according to various specifications and destinations. Such control circuit boards are manufactured on production lines in accordance with, for example, a cold district, a temperature region, and each country.

On product lines of the information apparatus, at an upstream side, control information common to each driving mechanism is obtained, a control circuit board is installed in an information apparatus, and the control information is installed in a nonvolatile memory (such as an EEPROM) on the control circuit board.

However, a unit test for obtaining the control information on each driving mechanism is a comparatively time consuming operation requiring the use of special jigs. For example, assuming that the unit test takes 10 minutes per information apparatus, it would be extremely inefficient as a product line process. Therefore, as shown in FIG. 10, a conventional production site is designed so that ten product lines 100, for example, are prepared with the corresponding inspection stations 110 each where unit testing is performed. Personal computers 110a and 120a are located and connected in communication with each other between the inspection stations 110 and an assembly station 120 where control circuit boards are installed. At the assembly station 120, the control information sent from each of the inspection stations 110 is installed in control circuit boards.

The operating efficiency is increased by performing the unit test at each of the inspection stations 110 and sending drive mechanisms from each inspection station 110 where unit testing is performed, for example, in increments of one minute, to the assembly station 120.

However, in this layout, the inspection stations 110 should be provided with the corresponding number of personal computers 110a, further communication equipment 130 should be required for connecting the personal computers 110a and the personal computers placed at the assembly stations 120. As a result, costs on facility investment are entailed.

In addition, elements (components) of a mechanical drive mechanism at shipment may be replaced due to consumption or malfunction. When an element of a mechanical drive mechanism is replaced with a new one, control information stored in a non-volatile memory on the control circuit board at shipment cannot be applied to a replaced element. The mechanical drive mechanism whose element has been replaced cannot be driven smoothly based on the control information at shipment.

SUMMARY OF THE INVENTION

The invention provides an electronic device having a detachable controller that controls a controlled part provided in a frame of the electronic device, even after replacement of an element of a mechanical module and without increasing costs on facility investment.

According to an aspect of the invention, an electronic device may include a first housing that includes the controlled part and a non-volatile first storage medium that stores control information regarding the controlled part, and a controller that is detachable from the first housing reads the control information from the first storage medium when attached to the first housing and controls the controlled part based on the read control information.

Accordingly, for example, the control information is obtained upstream on a production line and stored in the first storage medium that is non-volatile. Then, the controller is attached to the first housing of the electronic device downstream on the production line, such that the controller is capable of using the control information. This structure eliminates the need of locating any facilities (e.g., personal computers and communication equipment) for transmitting the control information on the production line, thereby greatly reducing costs on facility investment compared with conventional production lines.

According to the electronic device of the invention, when an element of the controlled part needs replacing, if control information after replacement is stored in the first storage medium, the controller can control the controlled part based on the new control information. Thus, the electronic device can be driven smoothly after replacement of the element.

The controller may include, an information obtaining device that drives the mechanical module and directly obtains an alternative characteristic of the mechanical module, a non-volatile second storage medium that stores the alternative characteristic obtained from the information obtaining device, and a determining device that compares the alternative characteristic obtained from the first storage medium and the alternative characteristic obtained from the second storage medium and determines whether a comparison result is within a specified range. The determining device may include a writing device that writes the comparison result in the first storage medium.

With this structure, when the comparison result is out of the specified range, it is stored in the first storage medium. If a part of the mechanical module is replaced with an incorrect module and the comparison result is out of the range, it can be found instantly that the replaced part is incorrect from the result.

The first storage medium may store identification information of the controlled part and the first housing in association with each other. When the controlled part and the first housing are assembled incorrectly, this mistake can be found instantly from the identification information stored in the first storage medium. Further, the control information may be read in a computer and stored in a database in association with the identification information. From the database, a relationship between an electronic device and its controlled part can be easily found. Thus, it can be possible to deal speedily with a problem, such as repairing of the controlled part.

BRIEF DESCRIPTION OF THE DRAWINGS

An exemplary embodiment of the invention will be described in detail with reference to the following figures wherein.

DETAILED DESCRIPTION OF PREFERRED EMBODIMENTS

An exemplary embodiment of the invention will be described in detail with reference to the accompanying drawings.

Figure 1:
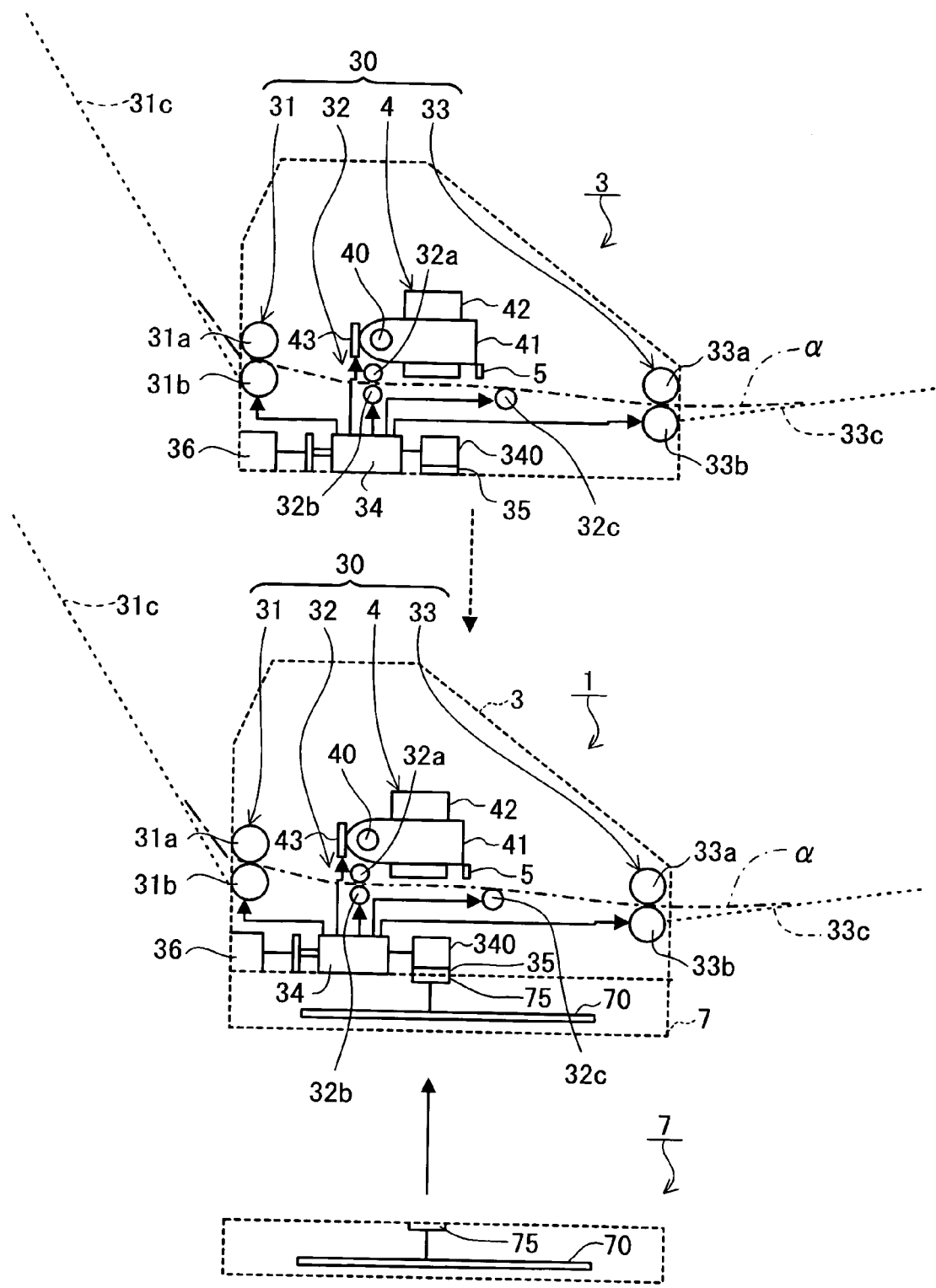
FIG. 1 is a schematic diagram of a printer according to an exemplary embodiment of the invention.

As shown in FIG. 1, a printer 1 includes two housings 3, 7, which are disposed vertically and detachably attached to each other. The housing 3 includes a mechanical module 30, a motor 34, and a power supply 36. The mechanical module 30 includes a sheet feeding mechanism 31, a recording sheet conveying mechanism 32, a paper ejection mechanism 33, and a recording mechanism 4.

The sheet feeding mechanism 31 includes a pair of sheet feed rollers 31a and 31b and a sheet supply tray 31c that accommodates recording sheets to be stacked thereon. The recording sheet conveying mechanism 32 includes conveying rollers 32a, 32b and 32c. The paper ejection mechanism 33 includes a pair of paper ejection rollers 33a and 33b and a discharged paper tray 33c.

Figure 5:
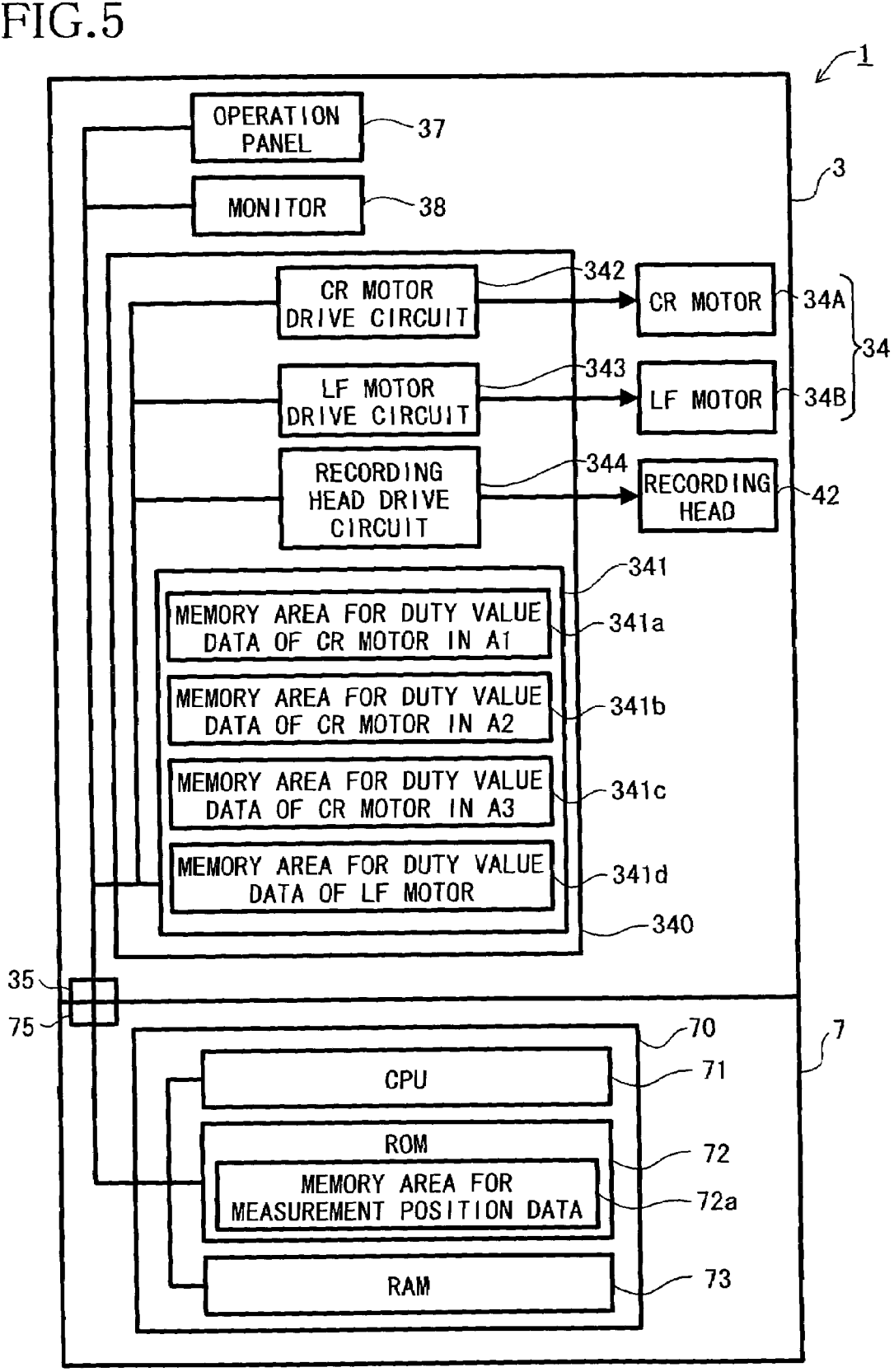
FIG. 5 is a block diagram of a controller of the printer.

The motor 34 gives a driving force to the mechanical module 30 as indicated by solid lines of arrows of FIG. 1. The motor 34 includes a driver circuit board 340. A control circuit board 70 in the housing 7, which will be described later, controls the operation of the motor 34 through the driver circuit board 340. In this embodiment, the motor 34 is made up of a carriage (CR) motor 34A and a line feed (LF) motor 34B (FIG. 5). The CR motor 34A is used for moving a carriage 41 of the recording mechanism 4 from side to side. The LF motor 34B is used for driving the sheet feed rollers 31a and 31b of the sheet feeding mechanism 31, the conveying rollers 32a, 32b and 32c of the recording sheet conveying mechanism 32, and the paper ejection rollers 33a and 33b of the paper ejection mechanism 33 to feed, convey and eject recording sheets.

The driver circuit board 340 includes an EEPROM 341, a CR motor drive circuit 342 for driving the CR motor 34A, a LF motor drive circuit 343 for driving the LF motor 34B, and a recording head drive circuit 344 (FIG. 5).

The power supply 36 receives electric power from power supplied for home use (or a commercial power source) and supplies it to the CR motor 34A and the LF motor 34B through the driver circuit board 340.

The recording mechanism 4 includes a guide shaft 40, the carriage 41 movable from side to side with respect to the guide shaft 40, a recording head 42 mounted on the carriage 41, and a moving belt 43 that transfers a driving force from the motor 34 to the carriage 41. The recording mechanism 4 further includes an encoder 5 that can detect a state or position of the carriage 41.

Figure 2:
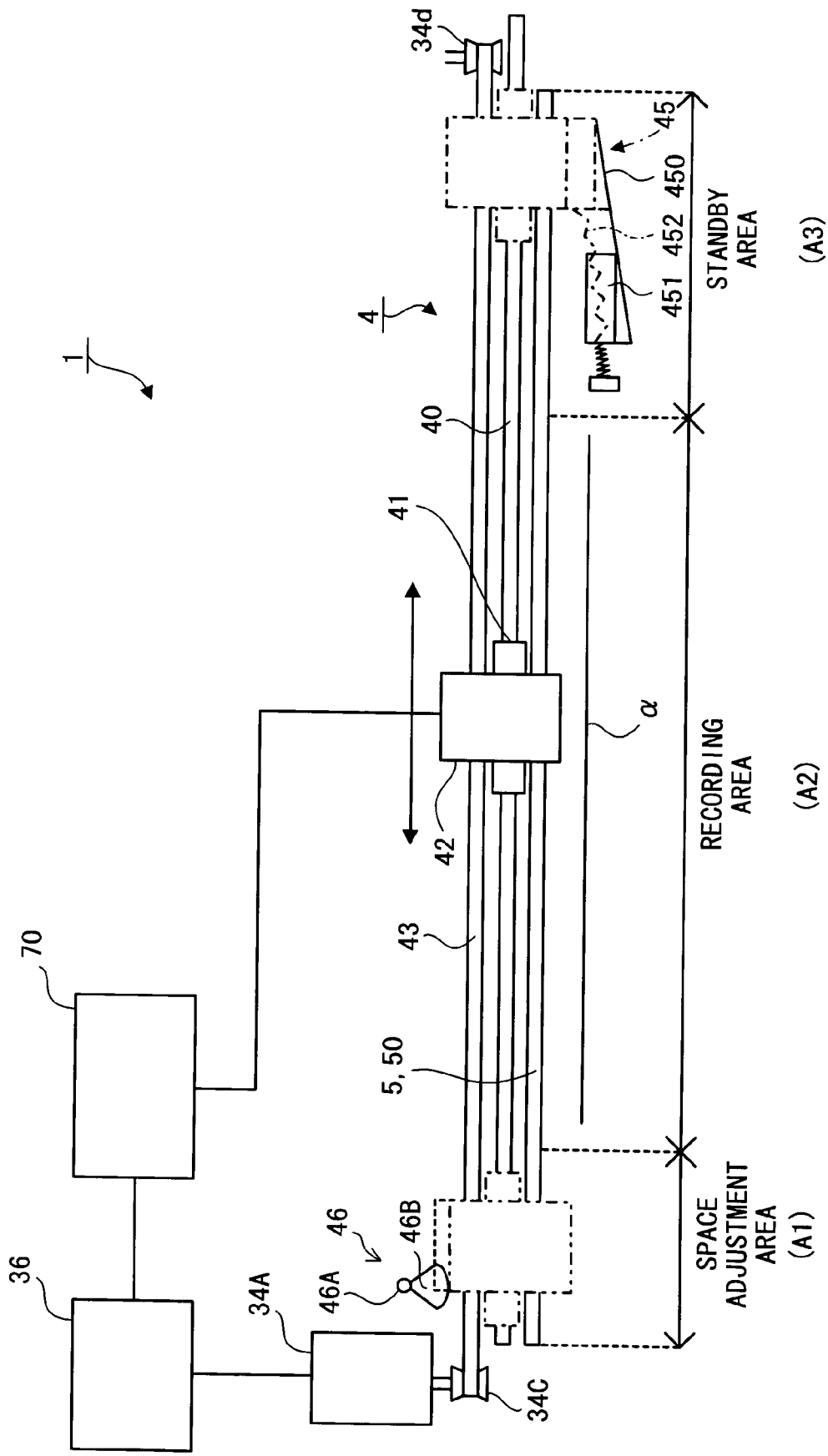
FIG. 2 is a schematic front view of a recording mechanism.

As shown in FIG. 2, the guide shaft 40 is disposed perpendicularly and horizontally with respect to a paper feed direction (which is a substantially left-right direction of FIG. 1 and a direction perpendicular to a face of FIG. 2).

The carriage 41 is attached to the guide shaft 40 so as to reciprocate.

The recording head 42 is mounted on the carriage 41 and ink tanks for storing a plurality of ink colors (not shown) are also mounted on the carriage 41. The recording head 42 is formed so as to selectively eject ink stored in the ink tanks onto a recording sheet α under the control of the control circuit board 70.

The moving belt 43 is an endless belt located parallel to the guide shaft 40. The moving belt 43 is looped around a pulley 34C, which is driven by the CR motor 34A, at an end, and around a pulley 34D, which is freely rotatable, at the other end. A part of the moving belt 43 is fixed to the carriage 41. Thus, the driving force of the CR motor 34A is transmitted to the carriage 41. The carriage 41 and the recording head 42 move along the guide shaft 40 as the moving belt 43 moves.

In addition to the above elements, the recording mechanism 4 includes a capping device 45 and a space adjustment device 46.

As shown in FIG. 2, the capping device 45 is located on one end of the guide shaft 40 (on the right end side of FIG. 2) and out of a recording area A2 for the recording sheet α. The capping device 45 includes a slope 450 that is uptilted outwardly from the recording area A2, a cap 451 that is movable on the slope 450, and a spring 452 that pulls the cap 451 toward the lower side of the slope 450. The carriage 41 includes a hook (not shown). When the carriage 41 moves from the recording area A2 to a standby area A3 along the guide shaft 40, the hook is caught in the cap 451. When the carriage 41 moves further toward the right end of the guide shaft 40 in the standby area A3, the carriage 41 pulls up the cap 451 along the slope 450. When the carriage 41 reaches the right end in the standby area A3, the cap 451 covers a surface of the recording head 42 where ink is ejected. Thus, the carriage 41 moves the cap 451 along the slope 450 against an urging force of the spring 452, so that a considerable load is applied to the carriage 451 unlike that applied to the carriage 451 in the recording area A2.

As the carriage 41 with the recording head 42 covered by the cap 451 is moved from the standby area A3 toward the recording area A2, the cap 451 urged by the spring 452 is pulled downwardly toward the lower side of the slope 450. The hook of the carriage 41 is separated from the cap 451 and the cap 451 is moved to the position shown by a solid line in FIG. 2.

The space adjustment device 46 is disposed on the rear side of the carriage 41. The space adjustment device 46 is designed to adjust the space between the recording head 42 and a recording sheet α according to the thickness of the recording sheet α. The space adjustment device 46 is comprised of a shaft 46A and an adjustment portion 46B rotatable on the shaft 46A. The adjustment portion 46B has a substantially sectorial shape viewed from a plan view, with each radius (length from the shaft 46A to the outside edge of the adjustment portion 46B) being different. A protrusion (not shown) is formed on a frame (not shown) of the printer 1. Depending on how far the carriage 41 moves leftward within the space adjustment area A1 shown in FIG. 2, it is determined whether the adjustment portion 46B contacts the protrusion. As the adjustment portion 46B contacts the protrusion, the adjustment portion 46B pivots about the shaft 46A. Accordingly, a portion of the adjustment portion 46B to contact the rear side of the carriage 41 is changed. Thus, the carriage 41 is mechanically moved in a direction vertical to the sheet α of FIG. 2. As the recording head 42 is mounted on the carriage 41, as a result, the space between the recording head 42 and the recording sheet α is adjusted. To adjust the space between the recording head 42 and the sheet α, the adjustment portion 46B has to pivot about the shaft 46A while contacting the protrusion formed on the frame, so that a considerable load is applied to the carriage 41 in the space adjustment area A1, unlike that applied to the carriage 41 in the recording area. Once the space between the recording head 42 and the recording sheet α is adjusted, the space remains fixed until the space is readjusted. Readjustment of the space is omitted. The space adjustment device 46 is not shown for the carriage 41 in the printing area A2 and the standby area A3 in FIG. 2 and the device 46 is only illustrated with the carriage 41 in the space adjustment area A1.

Figure 3:
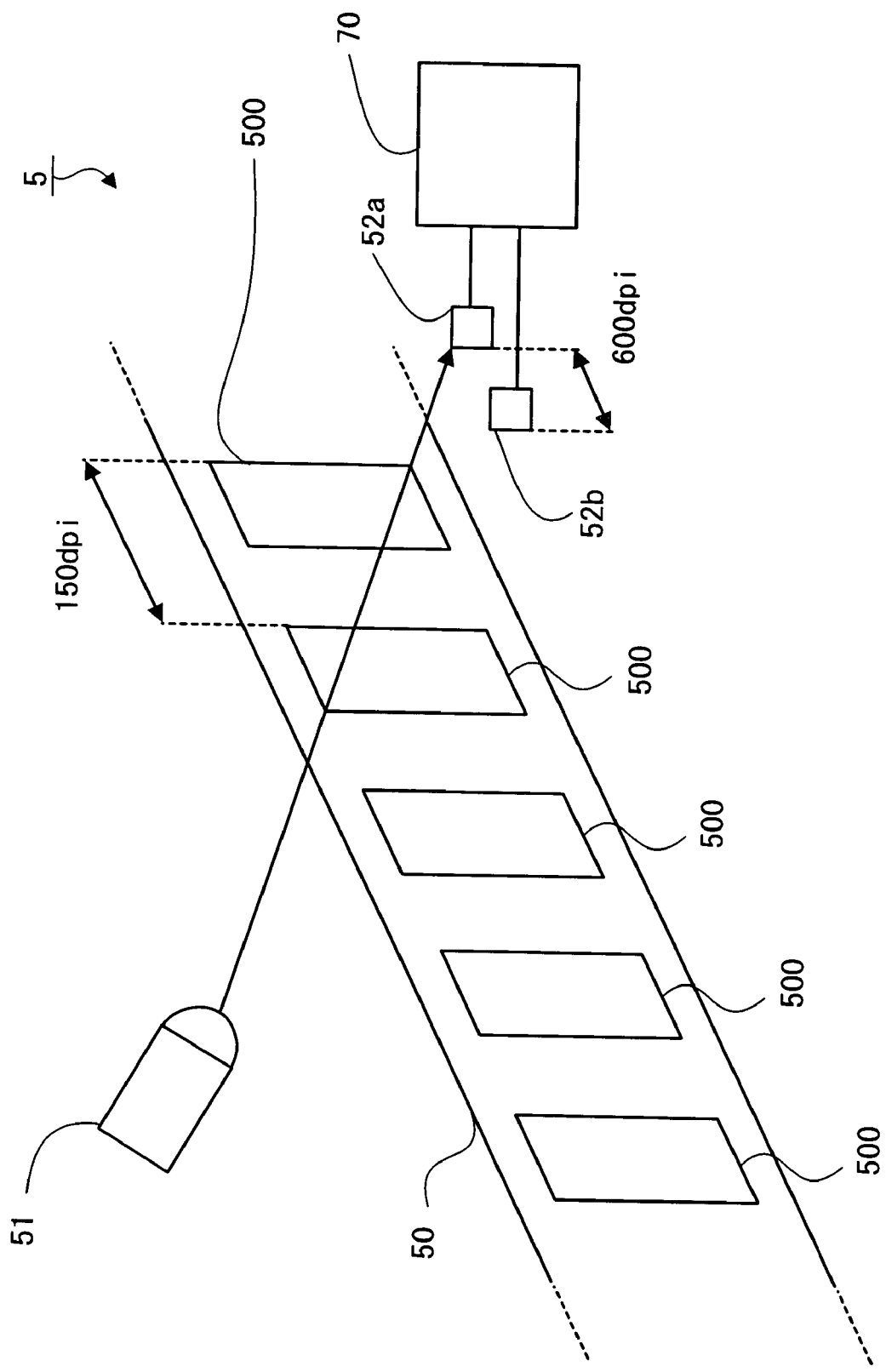
FIG. 3 is a schematic perspective view of an encoder.
Figure 4:
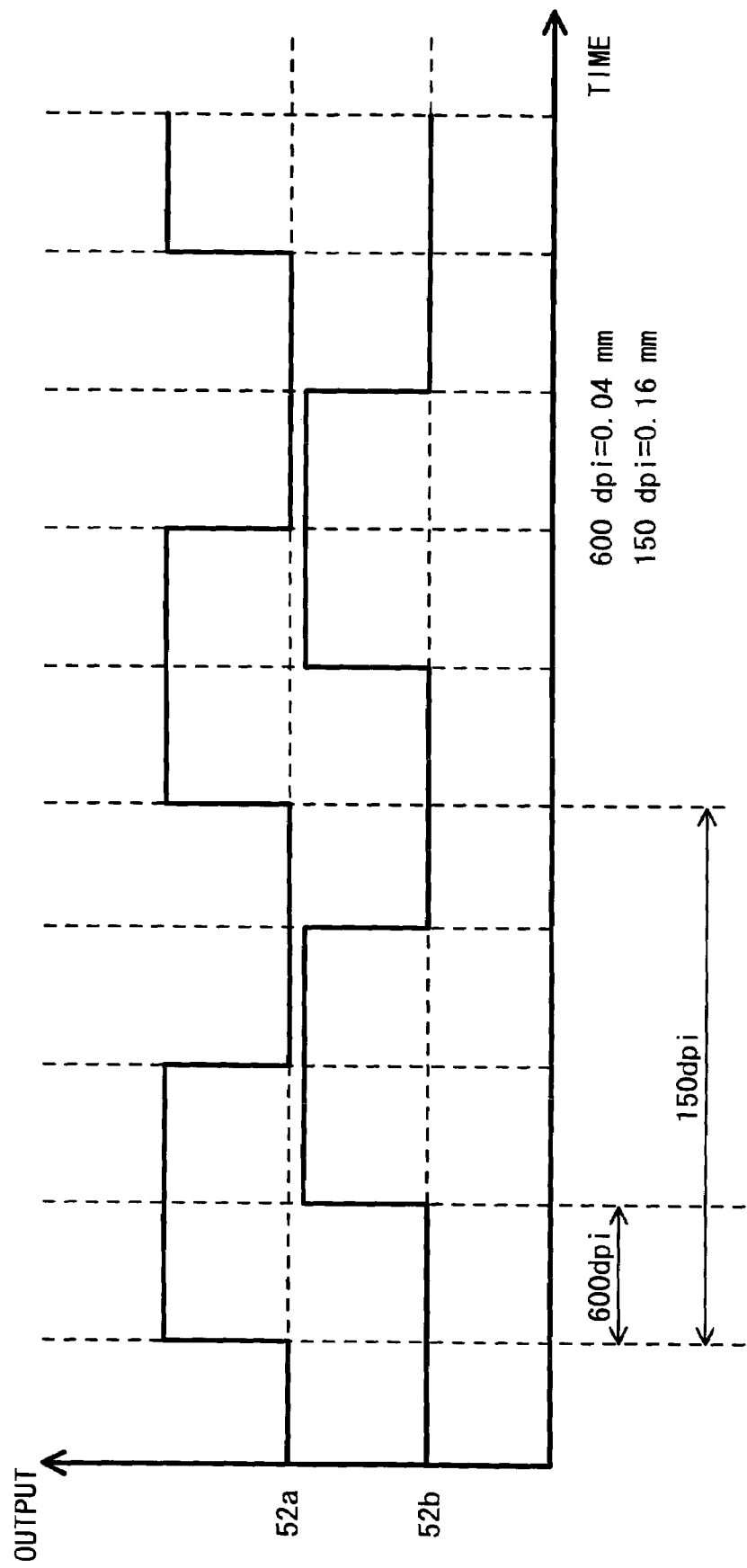
FIG. 4 is a time chart showing output of ON-OFF signals from a photoreceptor according to the embodiment of the invention.

Referring to FIG. 3, the encoder 5 will be described. The encoder 5 is structured in a well-known manner, and specifically, is made up of an encoder strip 50, a light emitting device 51, and two photoreceptors 52a and 52b.

The encoder strip 50 is placed along the guide shaft 40 as shown in FIG. 2, and formed with a plurality of slits 500 that allow light to pass through along the longitudinal direction at an interval of 150 dot per inch (dpi). Light is cut off at any place in the encoder strip 50 other than the slits 500.

The light emitting device 51 is a light emitting diode, and is disposed in the carriage 41 at a location a specified distance from a surface of the encoder strip 50 so as to be perpendicular with respect to the surface of the encoder strip 50.

The photoreceptors 52a and 52b are disposed in the carriage 41 so as to set face to face with the light emitting device 51 on the opposite side of the encoder strip 50 from the light emitting device 51. The photoreceptors 52a and 52b are located 600 dpi away from each other along the longitudinal direction of the encoder strip 50. The photoreceptors 52a and 52b are connected to the control circuit board 70 via the CR motor drive circuit 342.

When the encoder 5 causes the light emitting device 51 to emit light while the carriage 41 moves, the photoreceptors 52a and 52b receive the light emitted from the light emitting device 51 if the light emitting device 51 passes across a slit 500, and the photoreceptors 52a and 52b do not receive the light if the light emitting device 51 passes in between a slit 500 and the next slit 500 (a portion that cuts off the light). Thus, according to the reception or non-reception of the light from the light emitting device 51, the photoreceptors 52a and 52b output on/off signals at specified time intervals. However, as the photoreceptors 52a and 52b are located 600 dpi away from each other, on/off signals are output in a 600 dpi phase shift. When the moving direction of the carriage 41 during reciprocating motion is changed, outputs of the on/off signals from the photoreceptors 52a and 52b are changed.

The lower housing 7 includes the control circuit board 70, at the bottom, that stores programs (firmware) for controlling the printer 1, and a connector 75 that is connected to the control circuit board 70 and located at an upper end of the lower housing 7, as shown in FIG. 1. The connector 75 is structured such that it is connected to the connector 35 when the housings 3 and 7 are assembled.

A controller of the printer 1 will be described with reference to FIG. 5.

The controller according to an exemplary embodiment of the invention includes the control circuit board 70 and the motor driver circuit 340. The control circuit board 70 is provided in the lower housing 7 and includes a CPU 71, a ROM 72, and a RAM 73. The motor driver circuit 340 is provided in the upper housing 3 and drives the CR motor 34A, the LF motor 34B, and the recording head 42. The controller is available when the connectors 35, 75 are connected by assembling the housings 3, 7. As described above, the driver circuit board 340 includes the EEPROM 341, the CR motor drive circuit 342, the LF motor drive circuit 342, and the recording head drive circuit 344.

The CR motor drive circuit 342 is designed to control the operation of the carriage 41. The control circuit board 70 controls the operation of the CR motor 34A that drives the carriage 41 via the CR motor drive circuit 342.

The LF motor drive circuit 343 is designed to control the operation of the LF motor 34B that drives the sheet feed rollers 31a and 31b of the sheet feeding mechanism 31, the conveying rollers 32a, 32b and 32c of the recording sheet conveying mechanism 32, and the paper ejection rollers 33a and 33b of the paper ejection mechanism 33. The control circuit board 70 controls the LF motor 34B via the LF motor drive circuit 343.

The recording head drive circuit 344 is designed to control the operation of the recording head 42 mounted on the carriage 41. The control circuit board 70 controls the printing operations of the recording head 42 via the recording head drive circuit 344.

The control circuit board 70 controls the power supply 36 (FIG. 1), thereby controlling the driving forces of the CR motor 34A and the LF motor 34B. The EEPROM 341, which is a nonvolatile memory, stores control information for correction as to the sheet feed rollers 31a and 31b, the conveying rollers 32a, 32b and 32c, the guide shaft 40, the carriage 41, the recording head 42, the CR motor 34A, the LF motor 34B, the moving belt 43, and the paper ejection rollers 33a and 33b. The control information includes their size and shape errors, attaching position errors, individual differences in motor skills, and alternative characteristics, which will be described later.

The driving force of the CR motor 34A is controlled by a plus width modulation (PWM), where the size of the driving force to be supplied to the CR motor 34A from the power supply 36 is changed.

The control circuit board 70 includes the CPU 71, the ROM 72, and the RAM 73. The ROM 72 stores various kinds of programs for operating the printer 1.

The housing 3 includes an operation panel 37 having a plurality of buttons used by a user to operate the printer 1, and a monitor (e.g. a liquid crystal display) 38 that is disposed at a front body part of the housing 3 and displays characters, letters and numbers, such as a telephone numbers, commands, and messages.

In the printer 1 of the exemplary embodiment, when the housings 3, 7 are assembled, the connectors 35, 75 are connected, the control circuit board 70 and the driver circuit board 340 are in communication with each other, thereby the control of the printer 1 can be performed in the control circuit board 70.

Figure 6:
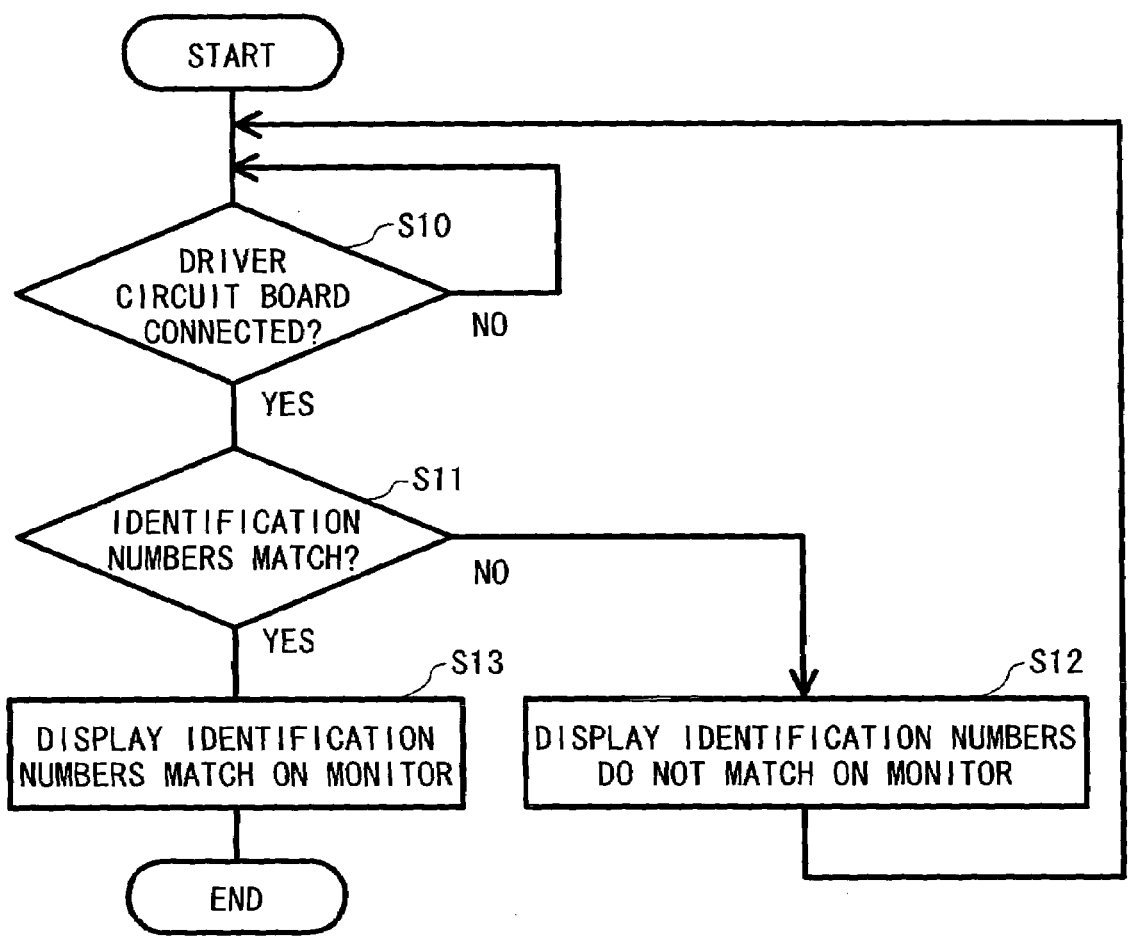
FIG. 6 is a flowchart of a recognition process.

The following is a description of each procedure performed in the controller described above. A recognition procedure of the control information, which is performed when the housings 3, 7 are combined and the connectors 35, 75 are connected, will be described. FIG. 6 is a flowchart of the recognition process of the control information.

The recognition process is started when the housings 3, 7 are combined and the control circuit board 70 of the printer 1 is turned on.

First, it is determined whether the EEPROM 341 on the driver circuit board 340 in the housing 3 is connected to the control circuit board 70 (S10). This step (S10) is made depending on whether the control circuit board 70 is in communication with the driver circuit board 340. While this is determined as negative (S10: No), the step is repeated until it is determined as positive. As the step is determined as positive (S10: Yes), the procedure goes to S11.

At S11, it is determined if identification numbers match. The identification numbers prove whether the ROM 72 on the circuit board 70 can control the EEPROM 341. More specifically, they prove whether the EEPROM 341 on the driver circuit board 340 is the one that is recognized by the ROM 72 having control information, such as addresses.

The identification numbers are stored in the ROM 72 on the control circuit board 70 and the EEPROM 341 on the driver circuit board 340, respectively. According to the matching or unmatching of the identification numbers, it is determined whether the control circuit board 70 can control the upper housing 3.

When the identification numbers do not match (S11: NO), a buzzer sounds to alert the user and an error message that the identification numbers do not match appears on the monitor 38 (S12), and the flow returns to S10. On the other hand, when the identification numbers match (S11: YES), a message that the identification numbers match appears on the monitor 38 (S13), and the process ends.

When this process ends, the control circuit board 70 is ready to read the control information stored in the EEPROM 341, and then can control the printer 1 based on the control information.

Figure 7:
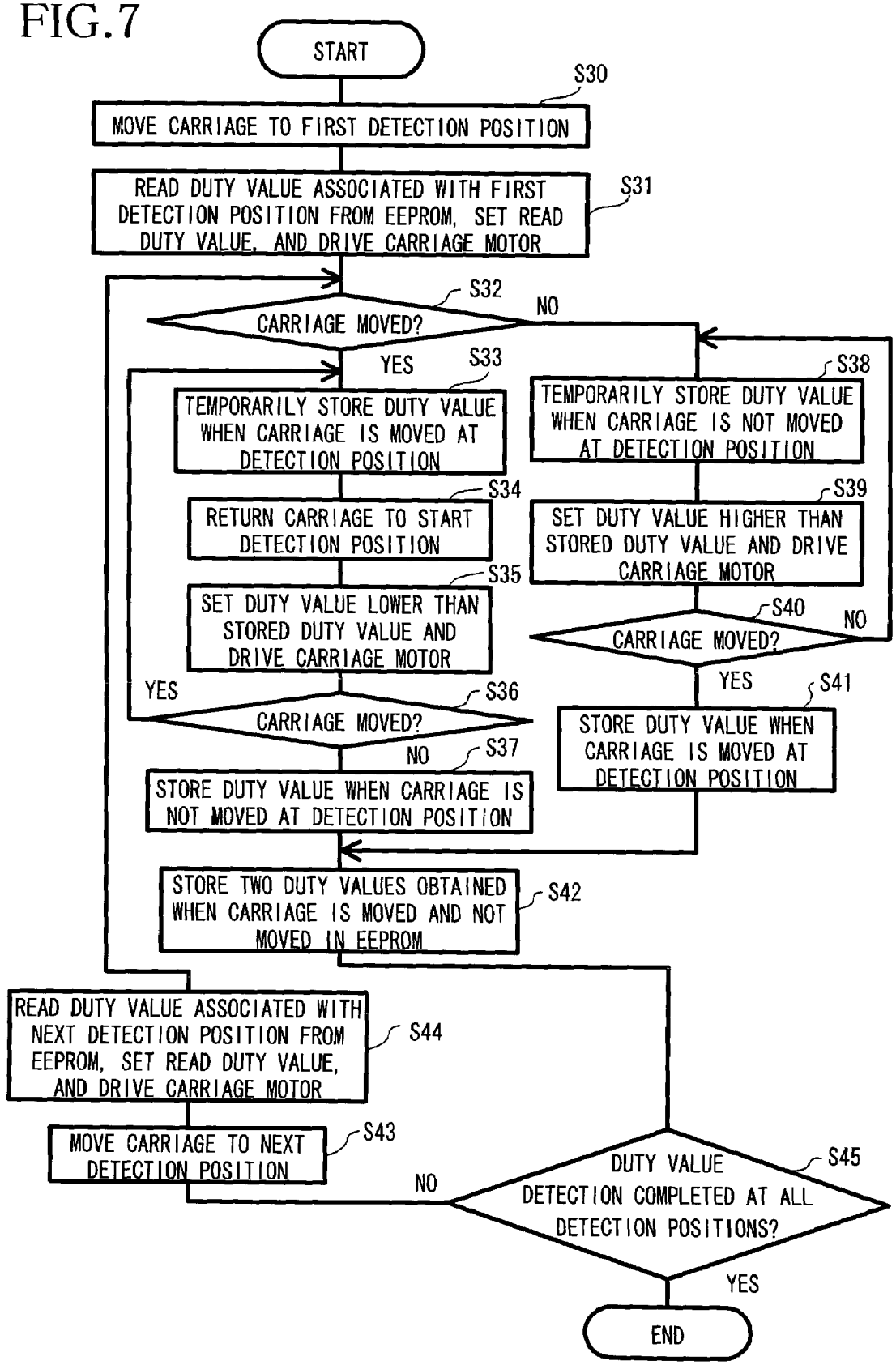
FIG. 7 is a flowchart of an alternative characteristic obtaining process.

A process for obtaining an alternative characteristic for a load applied to each mechanical module executed in the control circuit board 70 will be described with reference to FIG. 7. (The process may be hereinafter referred to as the "alternative characteristic obtaining process".)

This process is started when an instruction to obtain an alternative characteristic for each load is input from the operation panel 37. Hereinafter, the following description will be presented based on an example of obtaining an alternative characteristic when the carriage 41 moves on the guide shaft 40. Because it is difficult to make a brief description about obtaining alternative characteristics for various loads applied to all mechanical modules, the example is provided.

Figure 8:
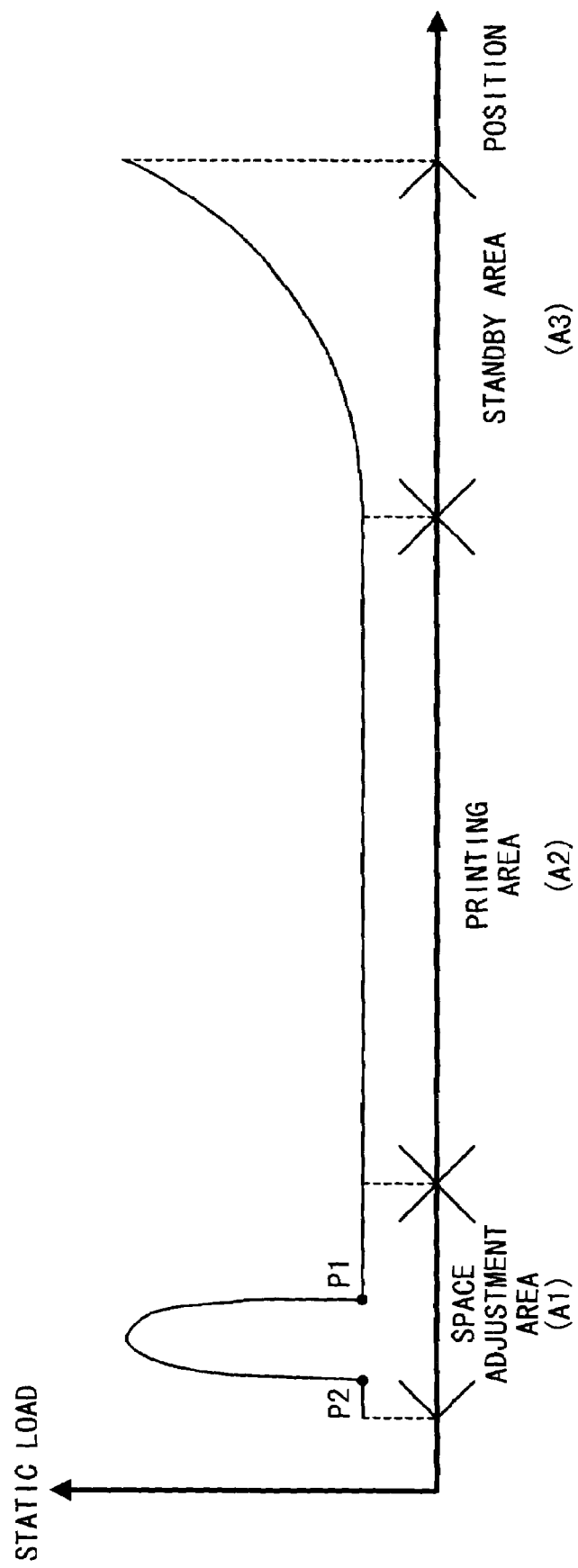
FIG. 8 is a graph showing a characteristic curve of load

As the alternative characteristic obtaining process is started, the CPU 71 moves the carriage 41 from the current position (original detection position) to a first detection position, which is previously specified based on measurement position data 72a stored in the ROM 72 (S30). For example, as shown in FIG. 8, the carriage 41 is moved from the standby area A3 to a position P1 just before an expected maximum load application position in the space adjustment area A1. At this time, a duty value of the CR motor 34A may be set to any values sufficient to move the carriage 41, so that the duty value may be set to 100%.

Then, a relevant initial reference duty value corresponding to the first detection position is read from the EEPROM 341 and the read duty value is set to the CR motor drive circuit 342 (S31). Duty value data of the CR motor 34A is stored in the EEPROM 341 in association with each area. In this embodiment, the duty value data of the CR motor 34A is stored in memory areas 341a, 341b, and 341c of the EEPROM 341 in association with the space adjustment area A1, the printing area A2, and the standby area A3, respectively. The duty value data of the LF motor 34B is stored in a memory area 341d of the EEPROM 341. Accordingly, when the carriage 41 is in the position P1 in the space adjustment area A1 shown in FIG. 8, the duty value of the carriage 41 is read from the memory area 341a of the EEPROM 341.

It is determined, based on information from the encoder 5, whether, when the CR motor 34A is driven based on the duty value read from the EEPROM 341, the carriage 41 is moved (S32). In other words, it is determined whether the condition of the carriage 41 is changed from the static condition (stationary or unmoving condition) to the dynamic condition (moving or operating condition). More specifically, this determination as to whether the carriage 41 is moved, is made by detecting whether the carriage 41 is moved to a distance of at least two slits 500 of the encoder strip 50. With this determination, a correct detection of the carriage 41 movement can be made, even when the carriage 41 is vibrated by the reception of the drive force from the CR motor 34A, and seems to move to a distance of about one slit 500.

Alternatively, instead of determining whether the carriage 41 is moved to the distance of two slits 500, the following determination may be made in S32 as to whether the carriage 41 is moved in the areas, such as in the space adjustment area A1 and standby area A3, where large fluctuations in the applied loads are expected. The moving range of the carriage 41 may set to, for example, positions P1 to P2 in FIG. 8, to include the expected maximum load application position. It may be determined in S32 whether the carriage 41 is moved from the start position P1 to the target end position P2.

When it is determined that the carriage 41 is moved (S32: YES), the duty value set at the time when the carriage 41 is moved is temporarily stored in the RAM 73 as the duty value that moves the carriage 41 in the detection position (S33). Then, the carriage 41 is moved back to the original detection position (S34). The duty value set in S31 is changed to a lower duty value, for example, by a predetermined amount. The lower duty value is set in the CR motor drive circuit 342. Based on the set lower duty value, the CR motor 34A is driven to move the carriage 41 (S35). When it is determined that the carriage 41 is moved (S36: YES), flow returns to S33. When it is determined that the carriage 41 is not moved (S36: NO), the duty value set in S35 is stored in the RAM 73, as the duty value that does not move the carriage 41 in the detection position (S37).

In S32, when it is determined that the carriage 41 is not moved (S32: NO), the duty value is temporarily stored in the RAM 73, as the duty value that does not move the carriage 41 in the detection position (S38). Thereafter, the duty value set in S31 is changed to a higher duty value, for example, by a predetermined amount. The higher duty value is set in the CR motor drive circuit 342. Based on the set higher duty value, the CR motor 34A is driven to move the carriage 41 (S39). When it is determined that the carriage 41 is not moved (S40: NO), flow returns to S38. When it is determined that the carriage 41 is moved (S40: YES), the duty value set in S39 is stored in the RAM 73, as the duty value that moves the carriage 41 in the detection position (S41).

The two duty values are obtained through S37 or S41 and stored in the RAM 73. The two duty values stored in the RAM 73 are overwritten into the memory area 341a of the EEPROM 341, as the duty values that moves and does not move the carriage 41 in the space adjustment area A1, in which the detection position is included (S42).

Thereafter, it is determined whether the alternative characteristics are obtained at all detection positions (S45). When it is determined that the alternative characteristics are not obtained at all detection positions (S45: NO), the carriage 41 is moved to a next detection position (S43). An initial reference duty value stored in the EEPROM 341 in association with the next detection position, is read from the EEPROM 341 and the read duty value is set to the CR motor drive circuit 342 (S44). When the carriage 41 is in the printing area A2, the duty value of the CR motor 34A is read from the memory area 341b of the EEPROM 341. When the carriage 41 is in the standby area A3, the duty value of the CR motor 34A is read from the memory area 341c of the EEPROM 341.

When it is determined that the alternative characteristics are obtained at all detection positions through S32 to S42 (S45: YES), the alternative characteristic obtaining process ends.

As the alternative characteristic obtaining process is executed, the two duty values that move and do not move the carriage 41 are obtained at each detection position. The two duty values are stored in the relevant memory areas 341a-341c of the EEPROM 341 in association with positional information. The duty values are the alternative characteristics of the loads on the carriage 41, and characterized in this embodiment, as shown in FIG. 8.

While the load applied to the carriage 41 substantially remains invariant in the recording area A2 where the recording head 42 performs printing on the sheet α, it gradually increases in the standby area A3 where the cap 451 caught in the hook needs moving along the slope 450 and going to the upper side of the slope 450 against the urging force of the spring 452 that pulls the cap 451 toward the lower side of the slope 450.

On the other hand, in the space adjustment area A1, when the carriage 41 moves to the other end of the guide shaft 40, the space adjustment device 46 contacts the protrusion formed on the frame (not shown) and undergoes displacement. Thus, a large force is instantly required for adjusting the space between the recording head 42 and the sheet α, so that the load to move the carriage 41 increases instantly.

Figure 9:
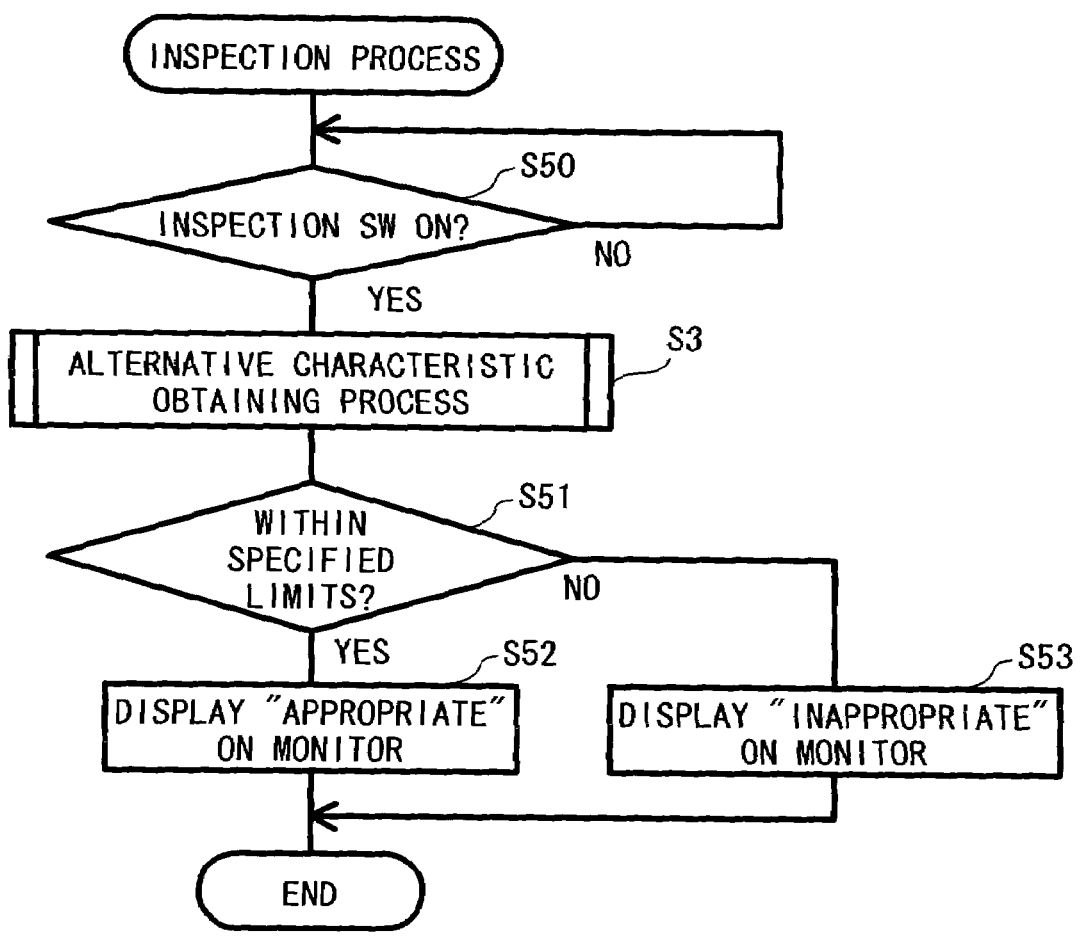
FIG. 9 is a flowchart of an inspection process.
Figure 10:
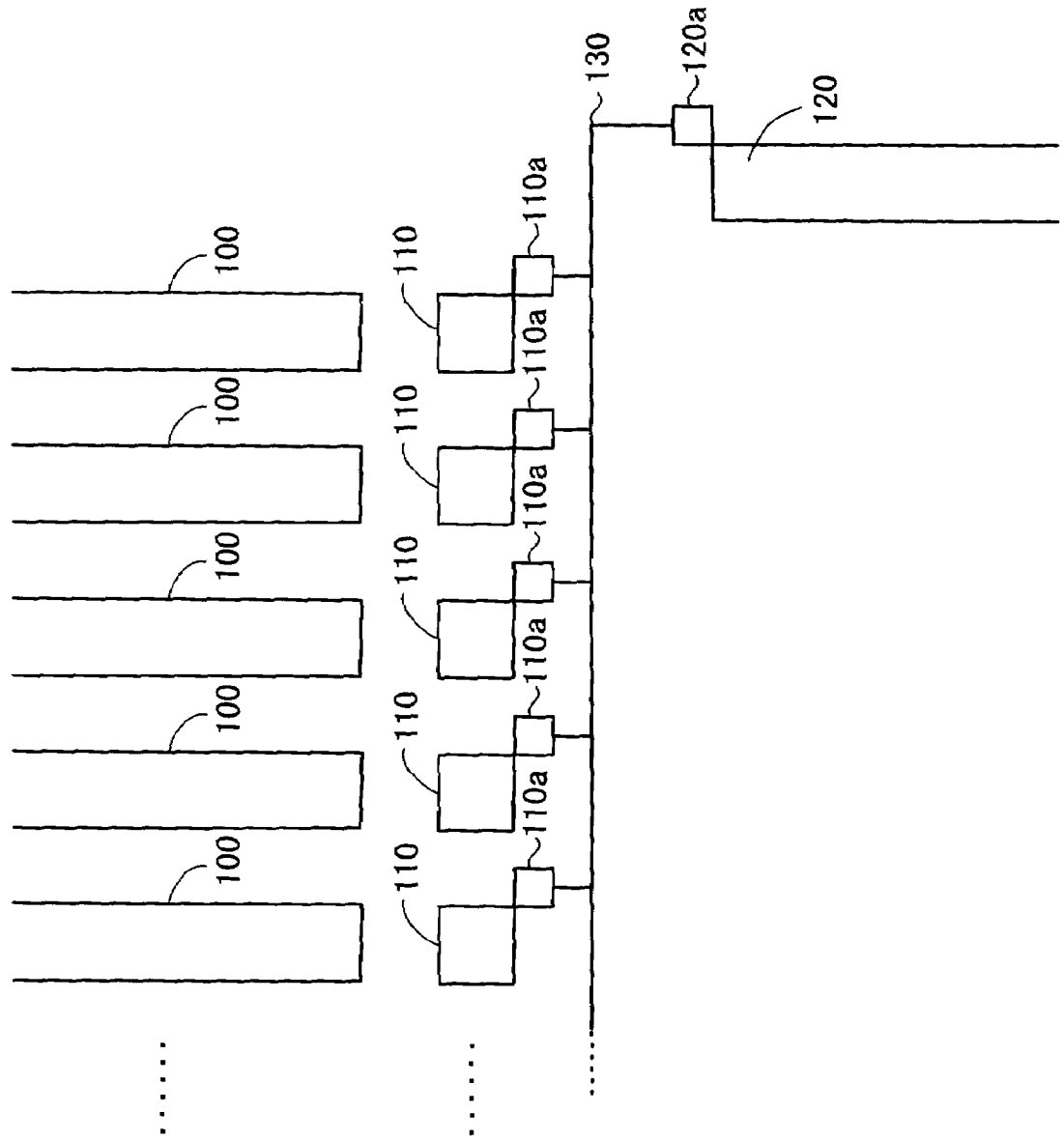
FIG. 10 is an illustration of a conventional product line.

An inspection process will be described with reference to FIG. 9.

The inspection process is executed with an instruction from the user when components of the printer 1 deteriorate with time.

The process is started when the power switch on the operation panel 37 is turned on with the housings 3, 7 connected. First, it is determined whether an inspection switch on the operation panel 37 is pressed alone or some combinational keys are pressed (S50). This step is repeated until the inspection switch is pressed or some combinational keys are pressed. When it is determined that the inspection switch is pressed or some combinational keys are pressed (S50: YES), an alternative characteristic obtaining process, which is substantially the same as the above alternative characteristic obtaining process (FIG. 7), is executed (S3). In the alternative characteristic obtaining process shown in FIG. 7, two duty values detected at each detection position are stored in the associated memory areas of the EEPROM 341. However, in S3 of FIG. 9, two duty values detected will be stored in the RAM 73. In other words, while the two duty values detected at each detection position are stored in the EEPROM 341 in S42 of FIG. 7, they are stored in the RAM 73 in S3 of FIG. 9.

A comparison between the alternative characteristics stored in the RAM 73 and the reference alternative characteristics stored in the EEPROM 341 is made (S51). In this step, it is determined whether the alternative characteristics stored in the RAM 73 are within specified limits (for example, ±5%) with respect to the alternative characteristics stored in the EEPROM 341. When it is determined that the alternative characteristics stored in the RAM 73 are within the specified limits (S51: Yes), a message that each component of the mechanical module 30 operates appropriately appears on the monitor 38 and the result is stored in the EEPROM 341 (S52), and the process ends. On the other hand, when it is determined that they are not within the specified limits (S51: NO), a message that each component of the mechanical module 30 does not operate appropriately appears on the monitor 38 (S53) and the result is stored in the EEPROM 341 (S52), and the process ends.

With the use of the above-described printer 1 of the embodiment, the following effects can be appreciated.

When the control information is obtained at the upstream side of the product line, the control information is stored in the EEPROM 341, non-volatile memory. The control information is available only by assembling the housings 3, 7 at the downstream side of the product line. This eliminates the necessity of placing any facilities to communicate the control information on the product line, such as a personal computer and a communication apparatus, thereby reducing costs on facility investment, compared as the conventional product line.

With the use of the above-described printer 1 of the embodiment, even when a component of the mechanical module 30 has been replaced with a new one due to secular change or damage, the control circuit board 70 can control the printer 1 based on the control information after replacement because the control information of the mechanical module 30 is stored in the EEPROM 341. Thus, after replacement, the control circuit board 70 can operate the printer 1 smoothly.

According to the exemplary embodiment shown in FIG. 6, a determination is made as to whether the identification information stored in the ROM 72 matches the one stored in the EEPROM 341 (S11), and its result is displayed on the monitor 38 (S12, S13). Even when the housing 7 including an improper control circuit board 70 is assembled to the housing 3, the error can be quickly checked.

According to the exemplary embodiment, with the operation of the operation panel 37 of the housing 3, alternative characteristics can be stored in the RAM 73, a volatile memory, as described in the alternative characteristic obtaining process. The alternative characteristics and those previously stored in the EEPROM 341, a non-volatile memory, are compared. As a result, as shown in FIG. 9, if alternative characteristics stored in the RAM 73 are not within the specified limits (S51), a message that they are inappropriate appears on the monitor 38 (S52). Thus, if there is a possibility that an operational problem, for example, a heavy load, occurs after shipping, such a problem can be noticed early. In this case, the user aware of such a problem early can get in touch with an expert repairer. Thus, repairing can be made before the printer 1 is completely broken.

At a production site, individual identification marks for all recording mechanisms 4 manufactured, for example, serial numbers of all manufactured production models may be recorded in the EEPROM 341 of the embodiment and stored in a database in association with feature values and alternative characteristics at the time of shipment. When a problem is pointed by a user and an individual identification mark of an object in question is given by the user, it can be possible to deal speedily with the problem by finding the individual identification mark from the database.

While the invention has been described with reference to a specific embodiment, the description of the embodiment is illustrative only and is not to be construed as limiting the scope of the invention. Various other modifications and changes may occur to those skilled in the art without departing from the spirit and scope of the invention.

The EEPROM 341 is used in the embodiment, however, other non-volatile memories can be used instead.

As described above, the alternative characteristic obtaining process and the inspection process are described based on the alternative characteristics only for the carriage 41 being moved along the guide shaft 41, for the simplicity of description, instead of alternative characteristics for all mechanical modules provided in the printer 1. When the alternative characteristics are used for relevant mechanical modules for the drive controls for, for example, a recording sheet conveying mechanism and a recording head other than those for the carriage 41, it is preferable that an alternative characteristic obtaining process and an inspection process similar to those described above be performed for a plurality of mechanical modules that are to be controlled, and the obtained alternative characteristics be stored in a memory.

In the embodiment, the printer 1 is used as an example of electronic devices. However, the invention is not limited to this case. The invention can be applied to any electronic devices as long as they have electronically controlled mechanical modules.

What is claimed is:

1. An electronic device including a controlled part, comprising:
   a first housing that includes the controlled part and a non-volatile first storage medium, the first storage medium stores control information regarding the controlled part;
   a controller that is detachable from the first housing, reads the control information from the first storage medium when attached to the first housing and controls the controlled part based on the read control information, wherein the first housing includes a mechanical module and a drive source that provides a drive force to the mechanical module, and the controlled part is a driver circuit board of the drive source;
   a power supply device capable of supplying drive power to the drive source while changing a current value or pulse width modulation duty value of the drive power; and
   a detector that determines if the mechanical module is in a static condition or a dynamic condition, when the power supply device supplies the drive power to the drive source while changing the drive power,
   wherein the mechanical module includes a guide shaft, a carriage that reciprocates along the guide shaft, a recording head mounted on the carriage, and a transmission device that transmits the drive force from the drive source to the carriage.

2. The electronic device according to claim 1, further comprising a second housing that is detachable from the first housing and makes up a contour of the electronic device in connection with the first housing, wherein the first housing includes a first connector connected to the controlled part, the second housing includes the controller and a second connector connected to the controller, and the first connector and the second connector are connected when the second housing is attached to the first housing.

3. The electronic device according to claim 2, wherein the second housing is attached to a bottom of the first housing.

4. The electronic device according to claim 1, wherein the control information stored in the first storage medium includes an alternative characteristic of a load of the mechanical module, and the alternative characteristic is an electric current value or a pulse width modulation duty value at a time of detection by the detector.

5. The electronic device according to claim 4, wherein the controller includes an information obtaining device that drives the mechanical module and directly obtains an alternative characteristic of the mechanical module, a second storage medium that is non-volatile and stores the alternative characteristic obtained from the information obtaining device, and a determining device that compares the alternative characteristic obtained from the first storage medium and the alternative characteristic obtained from the second storage medium and determines whether a comparison result is within a specified range, and the determining device includes a writing device that writes the comparison result in the first storage medium.

6. The electronic device according to claim 1, wherein the first storage medium stores identification information of the controlled part and the first housing in association with each other.

7. The electronic device according to claim 1, wherein the control information stored in the first storage medium is provided with different values according to operational positions of the mechanical module.

8. The electronic device according to claim 1, wherein the mechanical module includes a sheet feed roller and a second transmission device that transmits the drive force from the drive source to the sheet feed roller.

9. The electronic device according to claim 1, wherein the driver drives a motor.

10. The electronic device according to claim 1, wherein operation conditions associated with the static condition and the dynamic condition of the mechanical module determined by the detector are temporarily stored in a storage medium.

11. An electronic device including a controlled part, comprising:
    a first housing that includes the controlled part and a non-volatile first storage medium, the first storage medium stores control information regarding the controlled part; and
    a controller that is detachable from the first housing, reads the control information from the first storage medium when attached to the first housing and controls the controlled part based on the read control information, wherein the first housing includes a mechanical module and a drive source that provides a drive force to the mechanical module, and the controlled part is a driver circuit board of the drive source, wherein the mechanical module includes a guide shaft, a carriage that reciprocates along the guide shaft, a recording head mounted on the carriage, and a transmission device that transmits the drive force from the drive source to the carriage.

12. The electronic device according to claim 11, wherein the mechanical module includes a sheet feed roller and a second transmission device that transmits the drive force from the drive source to the sheet feed roller.

13. The electronic device according to claim 11, wherein the driver drives a motor.

* * * * *